United States Patent
Müller-Riederer et al.

(10) Patent No.: US 8,789,557 B2
(45) Date of Patent: Jul. 29, 2014

(54) VENTILATION ARRANGEMENT FOR A FUEL TANK

(75) Inventors: Gerhard Müller-Riederer, Bretzfeld (DE); Bernd Kipp, Nörten-Hardenberg (DE)

(73) Assignee: A. Kayser Automotive Systems GmbH (DE)

( * ) Notice: Subject to any disclaimer, the term of this patent is extended or adjusted under 35 U.S.C. 154(b) by 226 days.

(21) Appl. No.: 13/224,385

(22) Filed: Sep. 2, 2011

(65) Prior Publication Data

US 2012/0055943 A1 Mar. 8, 2012

(30) Foreign Application Priority Data

Sep. 3, 2010 (DE) .......................... 10 2010 044 336

(51) Int. Cl.
*F16K 17/19* (2006.01)
*F16K 17/196* (2006.01)

(52) U.S. Cl.
USPC .................... 137/522; 137/493.4; 137/493.6; 137/493.9

(58) Field of Classification Search
USPC ............ 137/493, 493.3, 493.4, 493.6, 493.9, 137/522; 251/82, 83
See application file for complete search history.

(56) References Cited

U.S. PATENT DOCUMENTS

| | | | | |
|---|---|---|---|---|
| 115,982 | A * | 6/1871 | Porteous ..................... | 137/493.4 |
| 2,251,441 | A * | 8/1941 | Dillman ........................ | 137/316 |
| 3,424,951 | A * | 1/1969 | Barker .......................... | 361/170 |
| 4,018,314 | A * | 4/1977 | Richmond et al. ............ | 188/353 |
| 4,482,094 | A * | 11/1984 | Knape ............................. | 239/88 |
| 4,699,351 | A * | 10/1987 | Wells .............................. | 251/29 |
| 5,137,055 | A * | 8/1992 | Matsushima et al. ..... | 137/630.14 |
| 5,174,463 | A * | 12/1992 | Scharrer .................. | 220/203.26 |
| 5,211,151 | A * | 5/1993 | Nakajima et al. ............. | 123/520 |
| 5,407,131 | A * | 4/1995 | Maley et al. .................... | 239/90 |
| 6,293,266 | B1 * | 9/2001 | Oetting .................... | 123/568.21 |
| 6,843,271 | B2 * | 1/2005 | Weldon et al. ............. | 137/487.5 |

OTHER PUBLICATIONS

U.S. Appl. No. 13/617,273, filed Sep. 14, 2012, which is commonly owned with the present application.

* cited by examiner

*Primary Examiner* — John Rivell
*Assistant Examiner* — Seth W Mackay-Smith
(74) *Attorney, Agent, or Firm* — Fox Rothschild LLP

(57) ABSTRACT

A ventilation arrangement for the head space of the fuel tank of a vehicle consists of a valve assembly received in a housing (30), which assembly is arranged to produce a maximum pressure, which is not to be exceeded, a minimum pressure below which the pressure must not fall, and a random pressure, for example, for the tank filling process, within the head space. For this purpose a valve which is biased by a spring (25) in the direction towards an atmospheric connector (6) and is characterised by a sealing plate (17), and a valve biased by a spring (19) in the direction towards a connector (5) intended for connection to the head space, and a valve characterised by a sealing head (24) are provided, the latter of which is simultaneously connected to an electromagnetic drive in order to produce the random pressure. As a result of the constructional combination of all three valve functions in the housing (30), the mutually coaxial guidance of the sealing head (24) and of the sealing plate (17), a valve assembly is provided which takes up a small construction volume and is suitable in particular for use under the spatially limited installation conditions of a hybrid vehicle.

10 Claims, 5 Drawing Sheets

VENTILATION ARRANGEMENT FOR A FUEL TANK

BACKGROUND

The invention relates to a ventilation arrangement for the fuel tank of a vehicle with valves allocated to the head space thereof for producing a maximum pressure, which is not to be exceeded, a minimum pressure below which the pressure must not fall, and a randomly adjustable pressure which is intended for the tank filling process.

During the development of the drive means of motor vehicles, vehicles have been developed which, in addition to the conventional internal combustion engine, also contain an electromotive drive fed by a battery. These vehicles are also designated hybrid vehicles and make it possible to travel for a certain time using only an electric motor.

The mineral oil-based fuel required for operation of the internal combustion engine is stored in a fuel tank from which, when the engine is not running, vapours escape owing to vapour pressure differences with respect to the external atmosphere, these vapours passing through an activated carbon filter inserted into a ventilation line, the filter being intended to adsorptively bind hydrocarbon components. When the engine is running, on the other hand, these retained hydrocarbon components are picked up by air flowing in and supplied to the combustion process of the engine so that, either way, they are prevented from escaping into the environment.

Since, during exclusively electric operation of the vehicle, no external air flows through the activated carbon filter, stored hydrocarbon components are regenerated during this time. In order still to achieve at least almost complete regeneration despite the fact that the internal combustion engine is thus operating for a reduced period of time, a higher pressure than the external pressure is required in the head space of the fuel tank in order to reduce the quantity of hydrocarbon components to be adsorbed in the activated carbon filter. It is generally known to limit the pressure in the head space of the fuel tank for safety reasons by means of a pressure relief valve. When excess pressure or a maximum pressure occurs, this produces a through connection between the head space and the external atmosphere via a ventilation line. It is further known to limit the pressure drop within the tank during operation of the internal combustion engine as a result of continuous removal of fuel by means of a valve which produces a connection to the external atmosphere when the pressure falls below a minimum pressure, thereby achieving a pressure equalisation.

When the vehicle's tank is being filled, the gas volume displaced by the inflowing liquid fuel as well as fuel vapours must be channelled out of the tank. In so doing, a pressure equalisation with the environment must be produced by complete ventilation, since otherwise fuel will exit the filling pipe of the tank.

However, this requirement is contrary to the desire of having increased pressure in the fuel tank.

Operation of a fuel tank in which an increased internal pressure must be maintained therefore requires the presence of three valves. These must have sufficient sealing tightness or otherwise the pressure being created in the tank would be reduced if the vehicle is stationary for a long period and the initially mentioned conditions of desorption and adsorption, balanced according to quantity, of hydrocarbon components in the activated carbon filter could not be fulfilled.

It is known, to use respective spring loaded individual valves in order to limit a maximum pressure which is not to be exceeded and a minimum pressure below which the pressure must not fall. In addition to assembly costs, a problem with the use of three separate valves, including one intended for ventilation during tank filling, is, however, the space for housing such components which is extremely limited in precisely these hybrid vehicles owing to the presence of the electromotive drive.

SUMMARY OF THE INVENTION

It is the object of the invention to form a ventilation arrangement of the type presented in the introduction while retaining good functionality with respect to suitability for use in particular in hybrid vehicles. This object is achieved with such a ventilation arrangement by the features described herein.

The invention resides in the fact that at least the valves intended to produce a maximum and a minimum pressure are combined in a housing which is provided with connectors for connection to the head space of the fuel tank and for connection to the external atmosphere. The housing is therefore intended for use in the ventilation line of the fuel tank and, owing to the constructional integration of at least two valves, already presents advantages during assembly.

In one aspect, the invention may include a valve intended to produce a randomly adjustable pressure is also constructionally integrated into the housing and is fitted with an electromagnetic drive. The housing therefore unites all the valve functions associated with controlling the pressure in the head space of the fuel tank into a unified component.

In another aspect, the invention may be directed at the more detailed constructional formation of the functional elements required to produce a minimum and a maximum pressure in the head space of the fuel tank. Owing to the constructional combination of the sealing plate, which fulfils a valve function, with a sealing head, which closes a central opening in the sealing plate and also fulfils a valve function, the advantage is achieved of a design which requires only a small construction volume. This property is also found in the fact that the springs determining the bias of both valves are each supported at one end on the sealing plate or a component directly connected thereto, and are therefore disposed surrounding each other.

In another aspect, the invention may be directed at an advantageous embodiment of the electromagnetically switchable valve which permits the setting of a randomly selected pressure in the head space. Of particular advantage is the fact that in order to produce this valve function, the sealing plate which is provided in any case is used, which sealing plate is connected via a retainer to an anchor part which is guided in the annular coil of the electromagnetic drive. The valve parts intended to produce a minimum pressure therefore fulfil a double function in that, on the one hand, they prevent pressure in the head space falling below a minimum pressure value, i.e., if necessary, permit an inflow of atmospheric air and in that, on the other hand, for example for tank-filling purposes, they prevent the development of excessive counter pressure in the head space, i.e. permit an outflow of gas from the headspace, in particular a complete pressure equalisation with the environment. In this way a contribution is made also towards producing the lowest possible construction volume for such a valve group, which fulfils all the three valve functions mentioned in the introduction and therefore achieves particular suitability for use under the restricted installation conditions of a hybrid vehicle.

In another aspect, the invention may be directed at the installation and the support of the springs, the bias of which influences the switching behaviour of the two spring-loaded valves mentioned above in order to produce maximum and minimum pressures in the head space of the fuel tank. It is significant that the spring intended for setting a minimum pressure is of an adjustable bias.

In yet other aspects, the invention may be directed at the formation of the valve intended for producing a maximum pressure and at the support of the spring by which the switching behaviour of this valve is definitively influenced. It is significant that the bias of this spring is also adjustable. This can be achieved in a particularly simple manner in that a shaft connected to the sealing head is screwed, at its end facing away from the sealing head, to a yoke which forms a counter bearing for one end of this spring, the other end of which is supported on the side—which faces away from the sealing head—of the sealing plate or of a component connected thereto.

In an exemplary embodiment, the support plate, made, for example, of metal, is connected to the sealing plate, which preferably consists of a rubber-elastic material, in order to achieve a reliable sealing effect. In the same way, the sealing head can also be provided with a rubber-elastic coating on its side lying against the sealing surface.

In another aspect, the invention may be directed to the more detailed formation of the electromagnetic drive which is intended to set a random pressure in the head space.

In yet another aspect, the invention may be directed at the more detailed formation of the housing intended for all components of the valve assembly. This housing can be composed of two housing parts, in one of which the coil body of the annular coil is substantially received. Owing to the fact that the coil body is disposed in this housing part so as to be displaceable in the axial direction thereof and at one of its end faces the spring intended for producing a bias to produce a minimum pressure is supported, it is possible for this bias to be adjusted in a simple manner by displacement of the coil body. In general an adjustment of this type is required only once so that the position of the coil body can be fixed after complete adjustment of the bias in the housing part, for example by welding.

With the ventilation arrangement in accordance with the invention, a valve assembly is therefore provided which in a particular manner is adapted to the maintenance of a pressure in the head space of a fuel tank, which is higher than atmospheric pressure, in this way reducing evaporation of hydrocarbon components.

BRIEF DESCRIPTION OF THE DRAWINGS

The invention will be described in more detail hereinunder with reference to the exemplified embodiment illustrated in the drawings in which.

DETAILED DESCRIPTION

Figure 1:
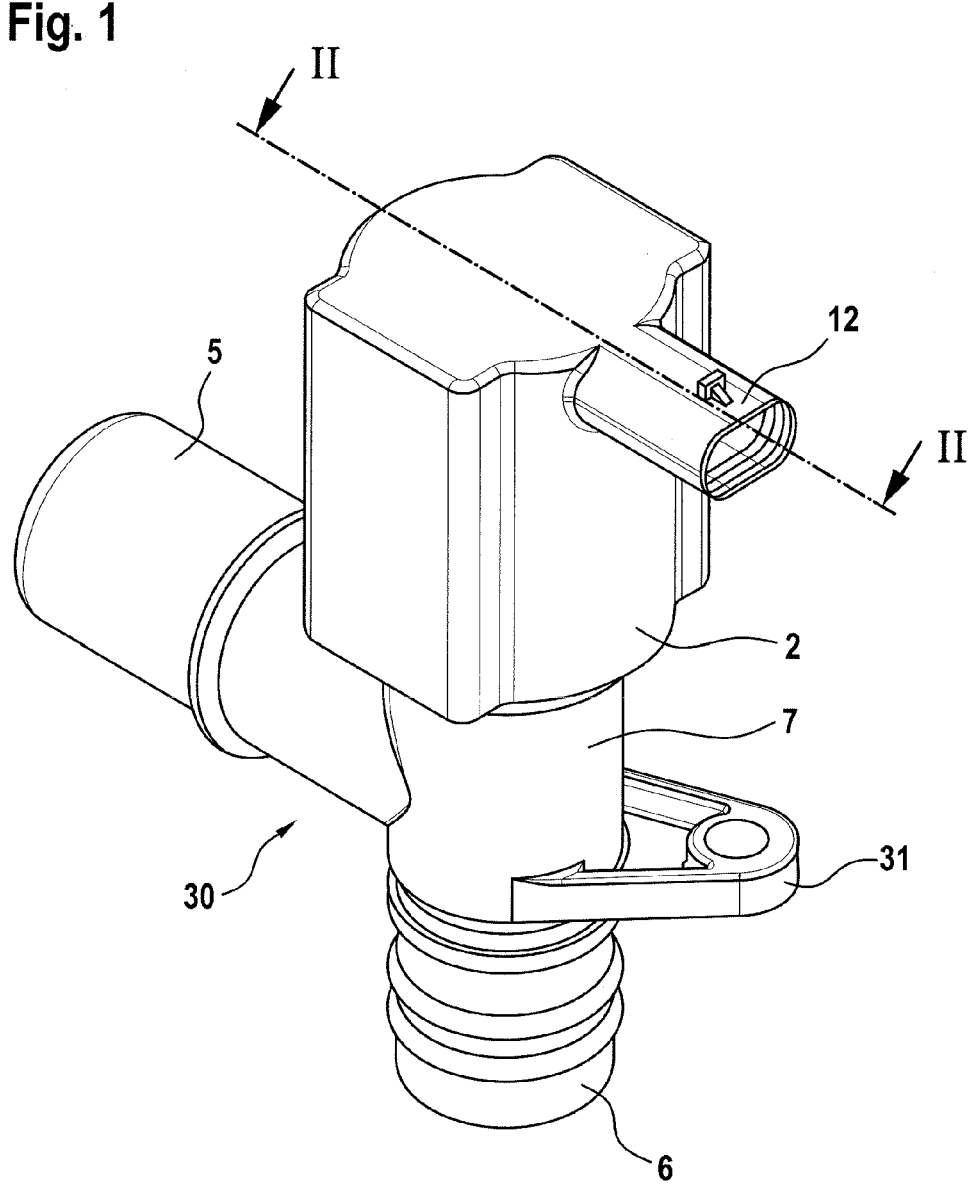
FIG. 1 is a perspective view of a valve assembly intended for use in a ventilation arrangement of a fuel tank.
Figure 2:
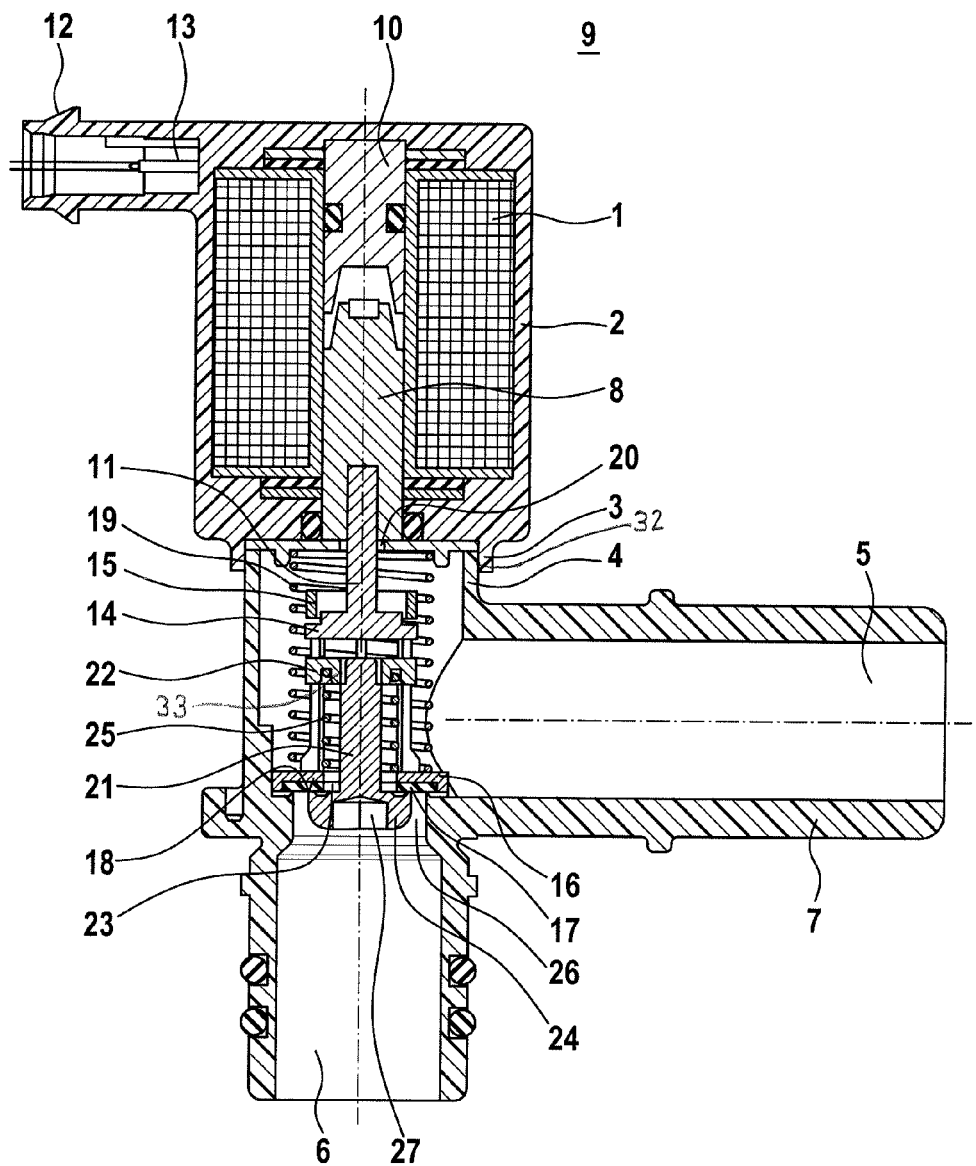
FIG. 2 illustrates the valve assembly according to FIG. 1 at a plane of cut II-II in an inoperative position.

As shown in the illustrations of FIGS. 1 and 2, the valve assembly in accordance with the invention consists of a first housing part 2 receiving an annular coil 1, which housing part is positioned on the underside via a collar 3 on a facing portion 4 of a connector 5 intended for connection to the head space of a fuel tank, and a second housing part 7 comprising a connector 6 intended for connection to the external atmosphere. The two housing parts 2, 7 in the assembled state form the housing 30 receiving all the components of the valve assembly.

The number 31 designates a bracket intended for attachment of the housing 30 to structures inside the vehicle.

A rod-like anchor part 8 is located within the annular coil 1 and extending in the direction of the axis thereof, the movement of which anchor part in the direction of an upper side 9 is limited by a fixedly disposed stop part 10. A coupling piece 11 connected to the anchor part 8 protrudes on the underside out of the housing part 2 and into the housing part 7. The housing part 2 therefore serves mainly to receive the coil body of the annular coil 1.

The number 12 designates a shoulder part which is integrally formed on the upper side of the housing 2 and which serves to receive an electric connector 13 for the annular coil 1.

The coupling piece 11 extends through an opening 20 in the housing part 7 and is connected at its lower end, via a support pad 14, to a retainer 15 which for its part is attached to a support plate 16. The support plate 16 is designed as a support for a sealing plate 17 preferably consisting of a rubber-elastic material, which sealing plate lies against a ring-like sealing surface 18 forming the inlet opening 26 of the connector 6.

The retainer 15 can fundamentally also be formed as one piece with the support pad 14.

The number 19 designates a spring, one end of which is axially supported on the side of the support plate 16 facing away from the sealing surface 18, and the other end of which is axially supported on the coil body of the annular coil 1 or the housing part 2. The sealing plate 17 therefore lies against the sealing surface 18 under a bias which is determined by the spring 19, wherein by axial displacement of the said coil body or of the housing part 2 an adjustment of this bias can be carried out. For example, between the housing parts 2, 7 a screw connection 32 can exist which permits a displacement of the position of these housing parts with respect to each other in the axial direction of the annular coil 1.

The number 21 designates a shaft which extends coaxially to the anchor part 8, one end of which, facing the anchor part 8, is connected to a yoke 22 which is disposed so as to be displaceable along the retainer 15. The shaft 21 is preferably screwed to the yoke 22 at 33. The other end of the shaft 21 extends through a central opening 23 in the support plate 16 and the sealing plate 17 and is connected, on the side facing the connector 6, to a pad-like sealing head 24 lying in a sealing manner against the edge of the opening 23.

The number 25 designates a further spring, one end of which lies against the side of the yoke 22 facing the support plate 16 and the other end of which lies against the side of the support plate 16 facing the yoke 22. This spring 25 determines the bias under which the sealing head 24 lies against the edge of the opening 23. It will be recognised that by means of the valve assembly in accordance with the invention three valve functions are produced which act independently of each other.

The shaft 21 in connection with the sealing head 24 lying under the bias of the spring 25 against the edge of the opening 23 forms a pressure relief valve which, in the open position, allows gasses to flow out of the head space of the fuel tank via the connector 5 and a circular ring-like opening between the shaft 21 and the inner surfaces of the opening 23 which face this shaft to the atmospheric connector 6. The excess pressure within the head space, which causes this pressure relief valve to open, is determined by the spring 25 and can be adjusted in that the shaft 21 is moved axially to a greater or lesser degree by means of its screw connection 33 to the yoke 22. For this purpose the sealing head 24 is fitted with a square socket profile 27 or a comparable profile intended to cooperate with a screwing tool.

The system consisting of the support plate 16, the sealing plate 17 lying against the sealing surface 18, the retainer 15 and the spring 19 forms a vacuum valve which, in the open position, permits gasses to flow in via the atmospheric connector 6, the inlet opening 26 and the connector 5 into the head space of the fuel tank. The negative pressure inside the head space, which leads to opening of this vacuum valve, is determined by the bias of the spring 19 which can be adjusted by axial displacement of the coil body of the annular coil 1 or of the housing part 2. Where there is a screw connection 32 between the housing parts 7, 2, this adjustment can be carried out in a particularly simple manner.

The system consisting of the annular coil 1, the anchor part 8, the coupling piece 11, the support pad 14, the retainer 15, the support plate 16 and the sealing plate 17 lying against the sealing surface 18 forms an electromagnetically switchable valve which, in the open position, permits a through connection between the connectors 5, 6 via the inlet opening 26. A switching position of the valve, namely the open position, occurs when the annular coil 1 is supplied with current, whereas the closing position occurs under the effect of the spring 19 when no current is supplied to the annular coil 1. This valve can be used to prevent the development of increased pressure in the head space of the fuel tank during the tank-filling process.

Figure 3:
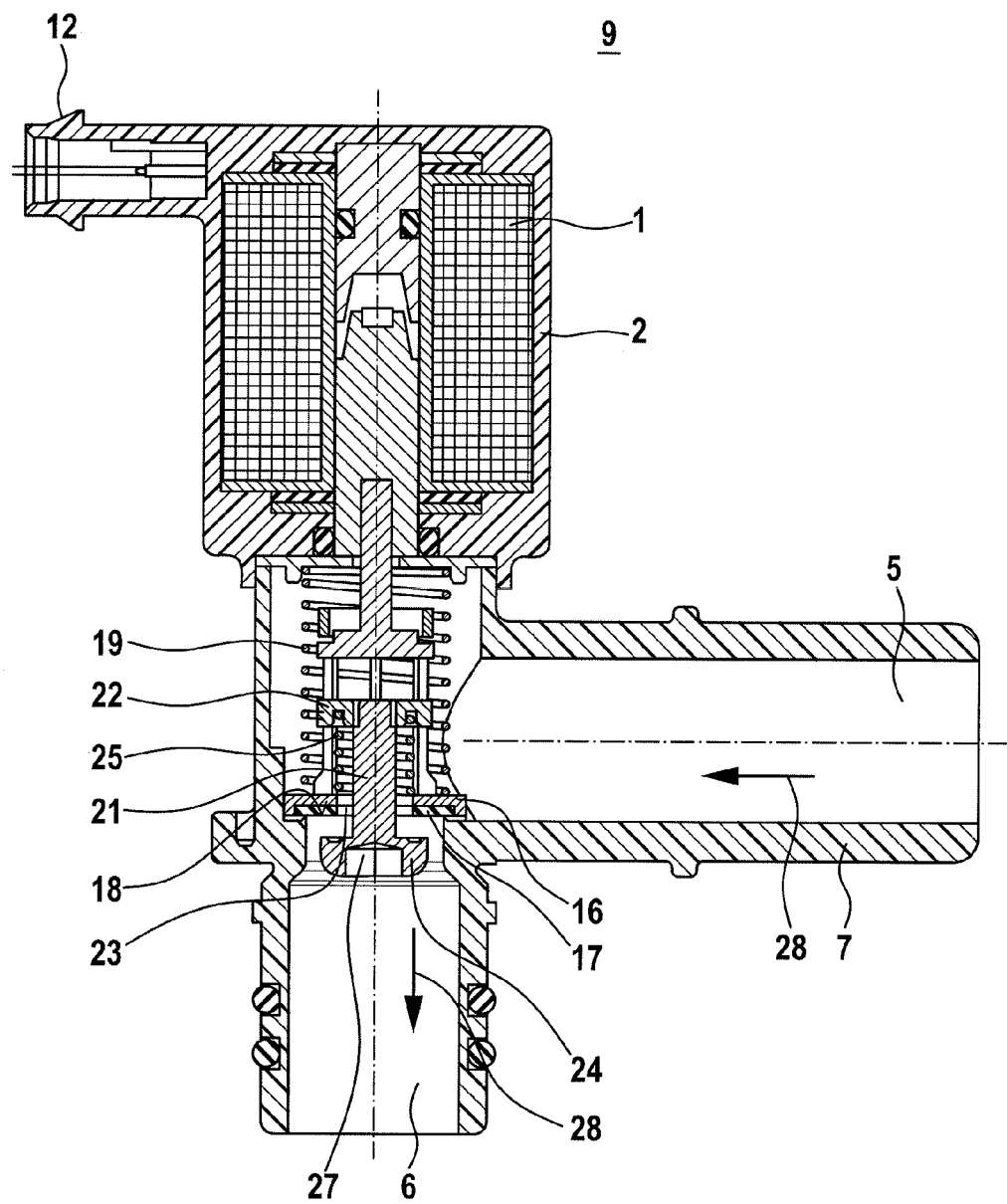
FIG. 3 illustrates the switching position of the valve assembly according to FIG. 2 when a maximum pressure is exceeded in the tank.
Figure 4:
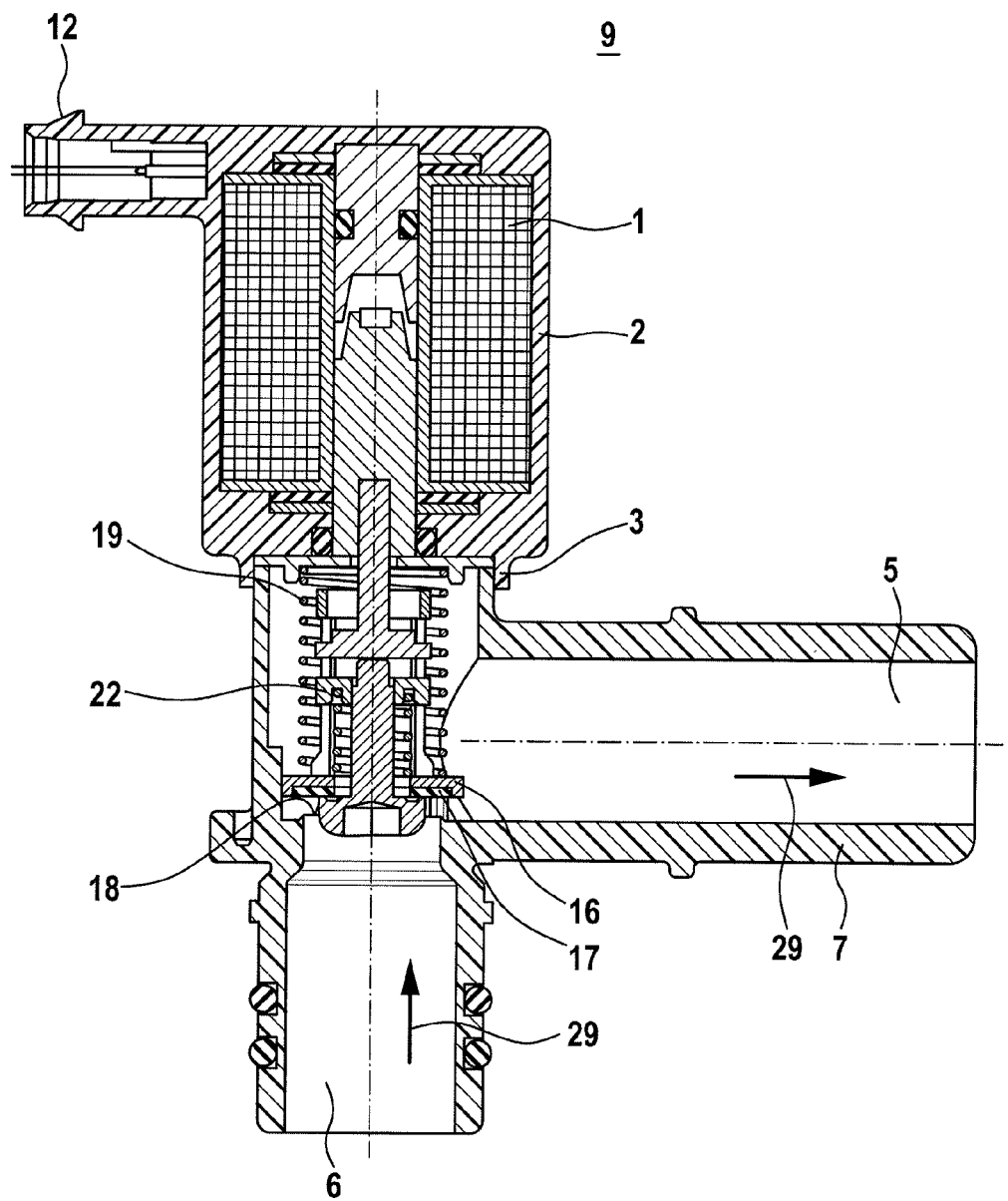
FIG. 4 illustrates the switching position of the valve assembly according to FIG. 2 when the pressure falls below a minimum pressure in the tank.
Figure 5:
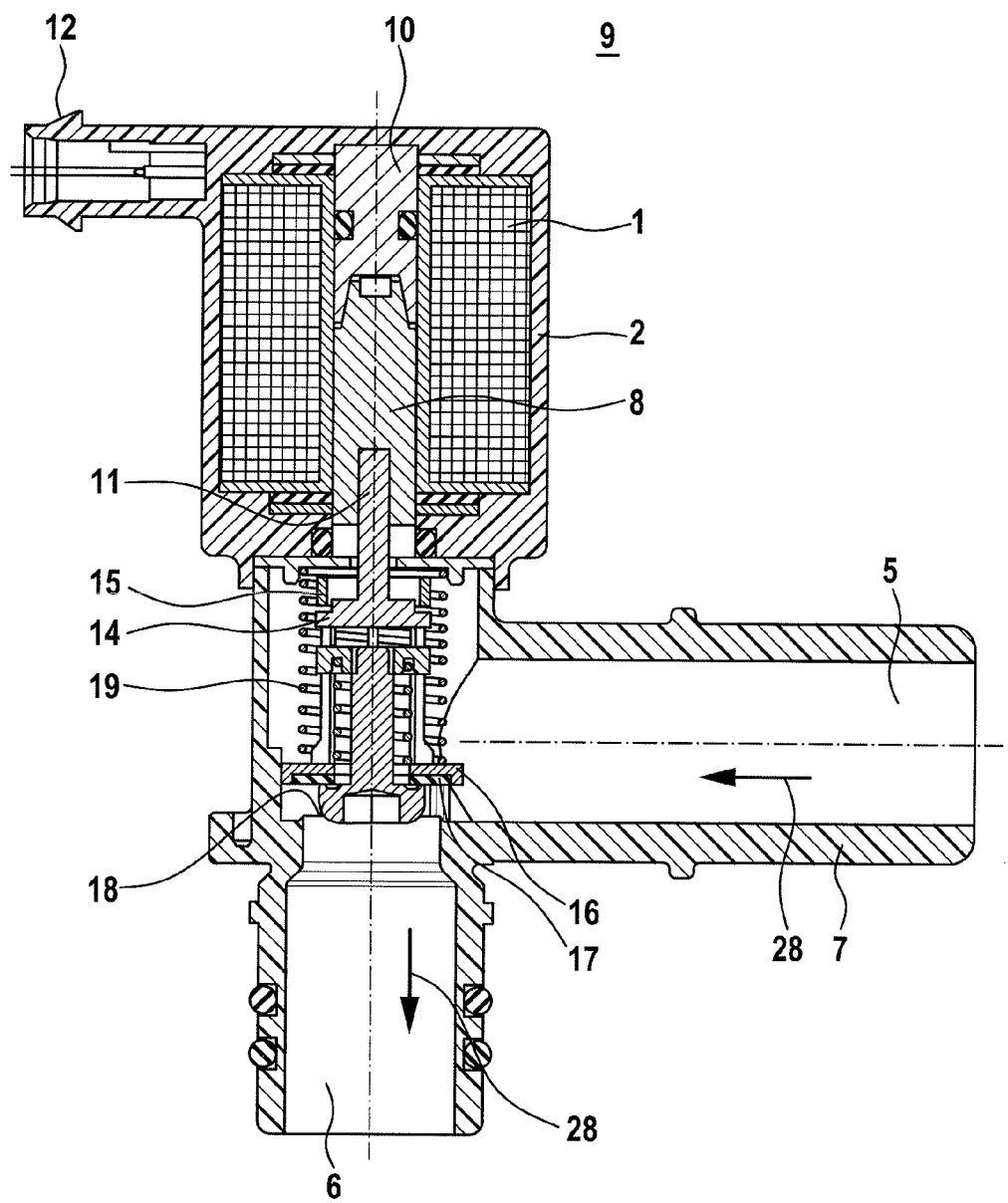
FIG. 5 illustrates the switching position of the valve assembly according to FIG. 2 for the purpose of filling the tank.

In FIGS. 3 to 5, which each show different switching positions of the valve assembly, there are functional elements which are numbered correspondingly to those of FIGS. 1 and 2, which means that there is no need to repeat the description thereof.

FIG. 3 shows the valve assembly in a switching position in which the pressure relief valve is located in the open position so that a gas flow in the direction of the arrows 28 is made possible, namely from the connector 5 in the direction of the connector 6. This means that the pressure within the head space of the fuel tank is greater than an acceptable pressure so that the force acting on the shaft 21 as a result of the differential pressure in relation to the atmospheric pressure is greater than the counter force set as a result of the bias of the spring 25. The annular coil 1 is not supplied with current.

FIG. 4 shows the valve assembly in a switching position in which the vacuum valve is in an open position so that a gas flow in the direction of the arrows 29 is made possible, namely from the connector 6 to the connector 5. This means that the pressure within the head space is lower than an acceptable pressure so that the force acting on the support plate 16 and the sealing plate 17 as a result of the differential pressure with respect to atmospheric pressure is greater than the counter force set as a result of the bias of the spring 19. The annular coil 1 is not supplied with current.

FIG. 5 shows the valve assembly in a switching position in which the annular coil 1 is supplied with current so that the vacuum valve is again located in the open position but wherein a gas flow in the direction of the arrows 28 is made possible, namely from the connector 5 to the connector 6 so that, within the head space of the fuel tank, during a filling process, no excessive counter pressure builds up. This means that the anchor part 8 together with the coupling piece 11, the support pad 14, the retainer 15, the support plate 16 and the sealing plate 17 is raised from the sealing surface against the bias of the spring 19, thus releasing a gas flow in the direction of the arrows 28. This valve function is used during a tank filling process, wherein the pressure below which this valve function is triggered can be selected. The pressure relief valve is located in the closed position.

It will be recognised that the valve assembly in accordance with the invention makes possible the setting of the highest permissible pressure in the head space of the fuel tank, of a pressure below which the pressure must not fall and a pressure suitable, for example, for problem-free filling of the tank.

It will also be recognised that the valve assembly in accordance with the invention makes it possible to set and maintain an increased pressure in the head space of the fuel tank and therefore is particularly suitable for use in hybrid vehicles.

REFERENCE LIST 1 annular coil
2 housing part
3 collar
4 portion
5 connector
6 connector
7 housing part
8 anchor part
9 top side
10 stop part
11 coupling piece
12 shoulder part
13 connector
14 support pad
15 retainer
16 support plate
17 sealing plate
18 sealing surface
19 spring
20 opening
21 shaft
22 yoke
23 opening
24 sealing head
25 spring
26 inlet opening
27 square socket profile
28 arrows
29 arrows
30 housing
31 bracket

The invention claimed is:

1. Ventilation arrangement for the fuel tank of a vehicle with valves allocated to the head space including a maximum pressure valve for producing a maximum pressure, which is not to be exceeded, a minimum pressure valve for producing a minimum pressure below which the pressure must not fall, and a random pressure valve for producing a randomly adjustable pressure intended for the tank filling process, with a housing receiving the maximum pressure valve, the minimum pressure valve, and the random pressure valve, an atmosphere connector intended for connection to the atmosphere and a head space connector intended for connection to the head space, wherein the random pressure valve is formed in an electromagnetically switchable manner and the minimum pressure valve is formed by a sealing plate which, under bias produced by a first spring in the direction towards the atmosphere connector, lies against a sealing surface formed by the edge of an inlet opening of the atmosphere connector, with the sealing plate at the same time being connected to an electromagnetic drive, in this respect fulfilling the function of the random pressure valve, with the sealing plate having a central opening, against the side of which, facing the atmosphere connector lies a sealing head, being under bias produced by a second spring in the direction towards the head space connector and fulfilling the function of the maximum pressure valve with the sealing head being connected to a shaft extending through the central opening and with one end of the second spring being supported on the side of the sealing plate facing away from the head space connector and the other end thereof being supported on a yoke connected to the shaft.

2. Ventilation arrangement as claimed in claim 1, wherein the drive of the random pressure valve consists of an annular coil, in the axial direction of which an anchor part is guided, which is connected to a retainer supporting the sealing plate and is disposed so as to move between an open position releasing the inlet opening and a closed position shutting off the inlet opening.

3. Ventilation arrangement as claimed in claim 2, wherein the first spring surrounds the retainer, wherein one end thereof is supported on a support plate supporting the sealing plate and the other end thereof is supported in a fixed manner on the housing.

4. Ventilation arrangement as claimed in claim 2, wherein the first spring surrounds the retainer, wherein one end thereof is supported on a support plate supporting the sealing plate (17) and the other end thereof is supported in an axially adjustable manner in the housing.

5. Ventilation arrangement as claimed in claim 1, wherein the bias of the second spring is adjustable.

6. Ventilation arrangement as claimed in claim 1, wherein the shaft is screwed to the yoke in order to achieve adjustability in the bias of the second spring.

7. Ventilation arrangement as claimed in claim 1, wherein the sealing plate consists of a rubber-elastic material.

8. Ventilation arrangement as claimed in claim 1, wherein the sealing head lies against the sealing surface with a disc consisting of a rubber-elastic material being disposed therebetween.

9. Ventilation arrangement as claimed in claim 2, wherein the anchor part is connected to the retainer via a coupling piece and the switching path of the anchor part is limited in a direction away from the retainer by a stop within the annular coil.

10. Ventilation arrangement as claimed in claim 1 wherein the housing consists of a first housing part, receiving the annular coil, and a second housing part supporting the atmosphere and head space connectors, wherein the second housing part is fitted with means for adjusting the bias of the first spring.

* * * * *